March 18, 1952

J. R. ORELIND ET AL
CONTROL VALVE FOR TELEMOTOR
TYPE HYDRAULIC POWER LIFT 2,589,850

Filed Feb. 14, 1947

INVENTORS.
John R. Orelind
Carl W. Mott
BY
Paul O. Pippel
Atty.

March 18, 1952

J. R. ORELIND ET AL 2,589,850

CONTROL VALVE FOR TELEMOTOR
TYPE HYDRAULIC POWER LIFT

Filed Feb. 14, 1947

INVENTORS,
John R. Orelind
Carl W. Mott
BY
Paul O. Pippel
Atty.

March 18, 1952

J. R. ORELIND ET AL 2,589,850

CONTROL VALVE FOR TELEMOTOR
TYPE HYDRAULIC POWER LIFT

Filed Feb. 14, 1947

INVENTORS.
John R. Orelind
Carl W. Mott
BY Paul O. Pippel
Atty.

Patented Mar. 18, 1952

2,589,850

UNITED STATES PATENT OFFICE 2,589,850

CONTROL VALVE FOR TELEMOTOR TYPE HYDRAULIC POWER LIFT

John R. Orelind, Wilmette, and Carl W. Mott, La Grange, Ill., assignors to International Harvester Company, a corporation of New Jersey Application February 14, 1947, Serial No. 728,408

13 Claims. (Cl. 121—41)

1

This invention concerns controls by means of which the plunger of a hydraulic ram is selectively controlled in its movement and more particularly relates to telemeter control of a remotely disposed ram.

One object of the invention is the provision of a control system adapted for operation in conjunction with a remotely disposed hydraulic ram and employing a single control conduit, by means of which fluid pumped in accordance with the direction of operation of the ram is operable to cause the ram to operate in accordance with the amount of movement of a control lever.

A further object is the provision of a hydraulic control system for a hydraulically driven ram and wherein a control member and movable parts of the ram are automatically rephasable.

Another object is the employment of a hydraulic ram control system wherein fluid for operating the ram is introduced into the control counterpart of the hydraulic system as an expedient for establishing a rephased condition of a control member and the ram.

Still another object is the provision of a hydraulic ram control system which is operable when containing liquid, and the system being of a character that when it is being initially filled with liquid, this liquid is obtainable from the power circuit for the ram and in a manner expelling air from and filling all voids in the liquid containing portions of the control system.

These and other desirable objects and advantages inherent in and encompassed by the invention will be more fully comprehended upon reading the ensuing description with reference to the annexed drawings, wherein.

2

Figure 1:
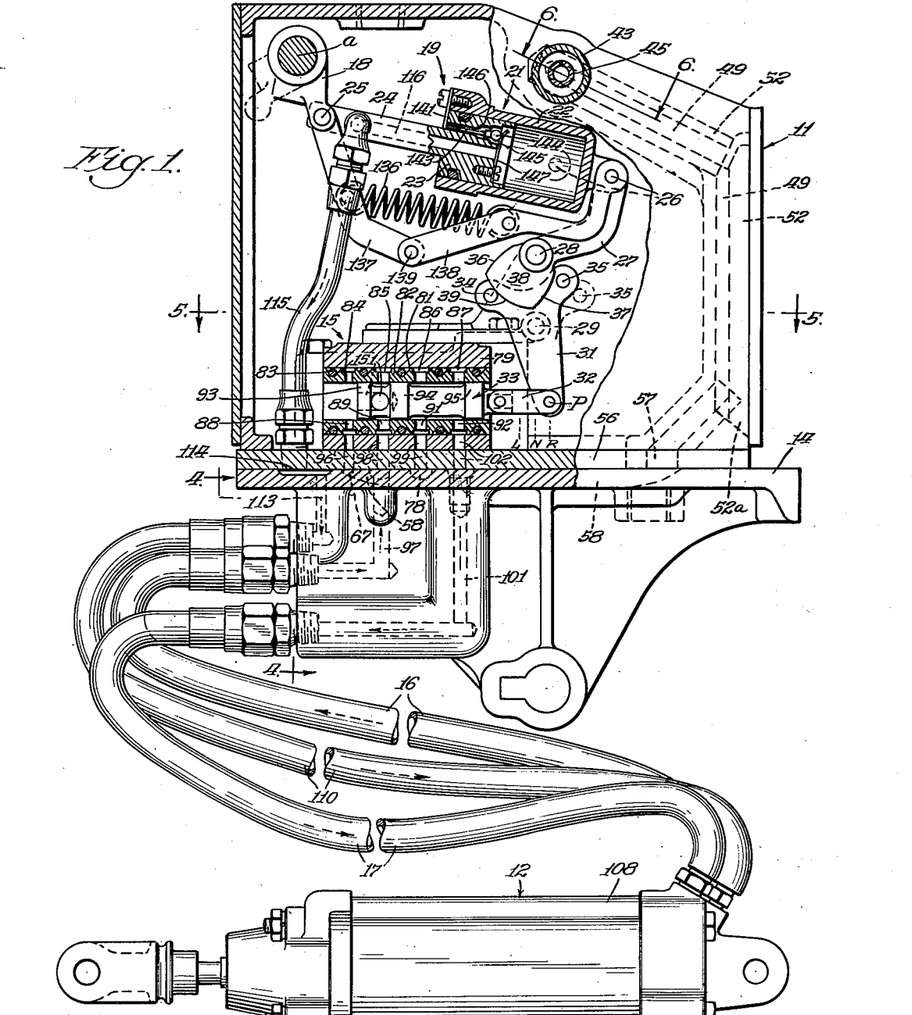
Fig. 1 is a side elevational view of a hydraulic ram and control means therefor constructed according to the principles of the invention, the control means for the most part being contained within a casing, of which a side wall portion is broken away and part of the control means within the casing being shown in section for clarity.
Figure 5:
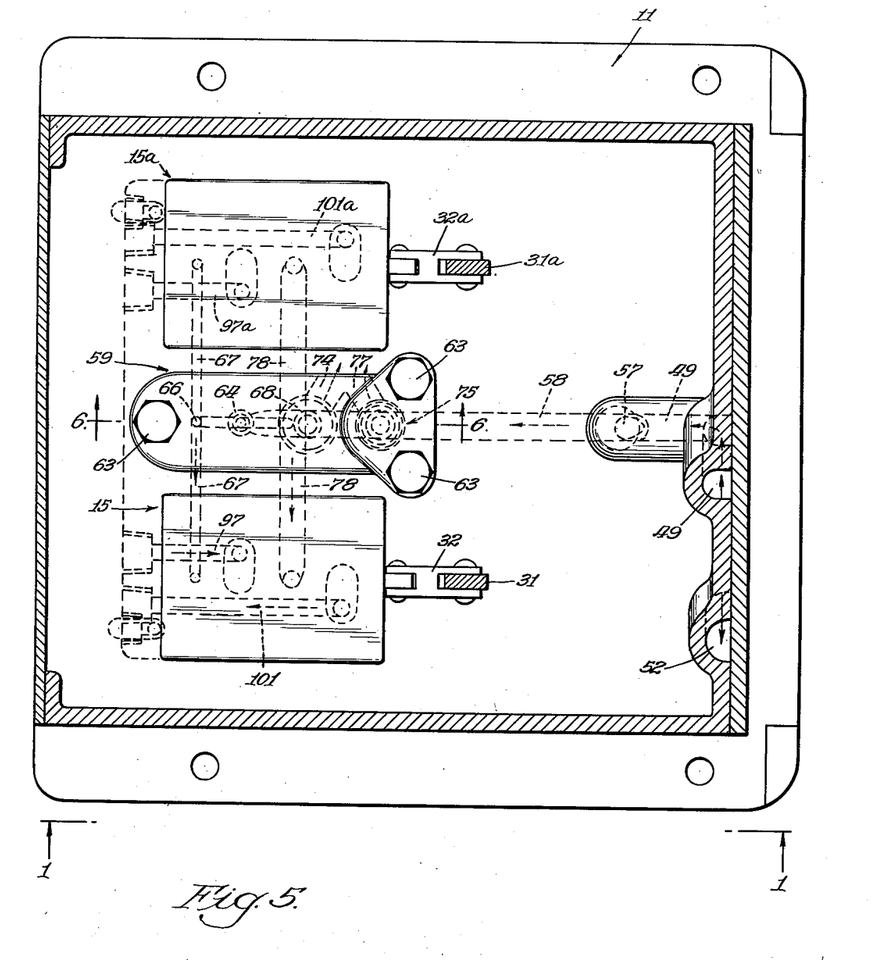
Fig. 5 is a horizontal sectional view taken through the apparatus as indicated by the line 5—5 of Fig. 1.

Referring now to the drawings wherein a single preferred embodiment of the invention is illustrated, apparatus contained within a reservoir casing 11, Figs. 1 and 5, is utilized for controlling the position of a piston 117 within a hydrulic ram unit 12. In Figs. 1 and 5 it can be seen that there is a duplication of the control apparatus for another similar ram (not shown), but since the two apparatus are the same the details of only one are herein described and corresponding parts of the other apparatus, where shown, are simply identified by corresponding reference numerals plus the letter $a$.

Figure 7:
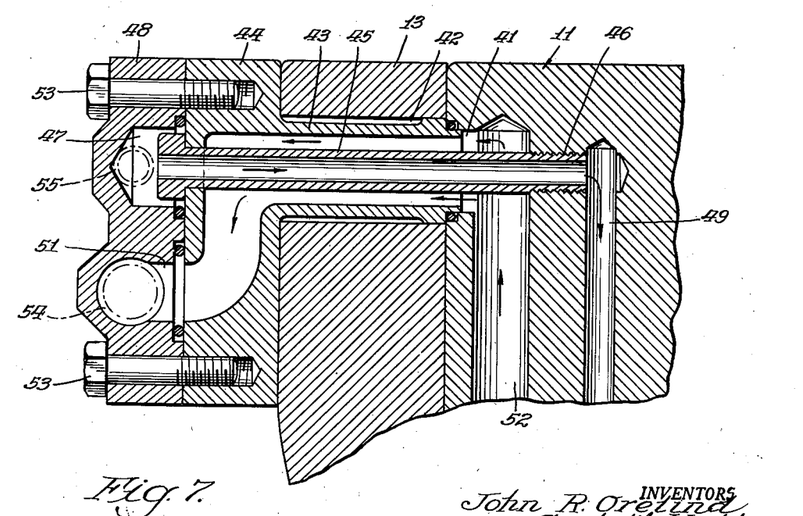
Fig. 7 is an enlarged fragmentary sectional view taken through a side wall of a hollow tractor body and showing an arrangement by means of which operating fluid for the hydraulic ram can enter through an opening in the tractor body and also exhaust through such opening, thereby adapting the apparatus for operation in conjunction with a pump mounted externally of the tractor body.

The casing 11 is adapted for mounting within the hollow body of a tractor (not shown), a side wall portion of the tractor body being indicated at 13 in Fig. 7. Said casing is adapted to be inserted upwardly into the tractor body through a bottom opening which is then closed by a plate 14 on the bottom of such casing. Fluid from a pump (not shown) driven by the tractor engine and mounted externally of the tractor body is delivered to a control valve 15 in the casing, and this valve is effective for selective introduction of fluid into hoses 16 and 17 for operating the ram unit 12 which may be mounted either upon the tractor or remotely therefrom.

The valve 15 is settable under control of a manually settable control member 18 which is rockable about an axis $a$. This member 18 is operably connected with the valve 15 by a hydraulic linkage or assemblage 19 including a hydraulic device 21 in the form of a cylinder 22 containing a piston 23 attached by means of a piston rod 24 and a pivot pin 25 with the rockable control member 18. One end of the cylinder 22 is pivotally connected at 26 with a lever 27 pivotally mounted upon a fixed pivot member 28. A second fixed pivot, 29, provides support for a lever 31 connected by a link 32 at its lower end with a spool 33 of the valve 15. Spaced-apart pins 34 and 35 on the upper end of the lever 31 are alternately pressable upon by profiles 36 and 37 of a cam head 38 on the lower end of the lever 27. A third profile, 39, of the cam 38 is alternately cooperable with the pins 34 and 35 for retaining the lever 31 in respective pivoted operating positions.

Control valve spool 33 is illustrated in Fig. 1 in position R, which is its rightmost limit of movement. Pivoting of the lever 27 counterclockwise from the Fig. 1 position for carrying the cam profile 37 against the pin 35 will return the valve spool to the neutral position N, at which time the pins 34 and 35 will be against their respective cam profiles 36 and 37. Movement of the valve spool to its leftmost position indicated by the letter L is accomplished by further counterclockwise pivoting of the lever 27 for causing the cam profile 37 to press against the pin 35 and thereby pivot the lever 31 clockwise. When the valve spool 33 is in position L, the lever 31 will be in the position illustrated by dotted lines. Continued pivoting of the lever 27 to its dotted line position can occur after the lower end of the cam profile 37 clears the pin 35 and as the cam profile 39 slides along the pin 35 in a relation with respect thereto as illustrated with regard to the pin 34 in Fig. 1.

When the spool valve 33 is in the neutral position N, the ram unit 12 will be hydraulically locked against operation. Movement of the ram plunger or piston in one direction is accomplished by setting the spool valve in the position R, whereas movement of the piston in the opposite direction can be accomplished by setting the valve spool in the position L. This will be fully explained presently after an explanation of the parts for conducting fluid to the valve from the pump (not shown).

When the casing 11 is inserted upwardly into the body of the tractor, a recess 41 in a side of the casing 11 is brought into axial registry with a hole 42 in the tractor body wall 13. Thereafter a tubular coupling member 43 having a head 44 upon its outer end is inserted into the tractor wall opening 42 for placing the interior of this tubular member 43 in communication with the recess 41. A tubular bolt 45 is inserted through the head 44 and the bore of the tubular member 43 and rotated into threaded engagement with a threaded countersink portion 46 of the bore 41. The hollow bolt 45 serves as a means for attaching the tubular member 43 and also the casing 11 and the tractor side wall 13 in assembly. Additionally, the hollow bolt 45 provides communication between a high pressure passage 47 in a manifold cap 48 and a high pressure channel 49 in a side wall of the casing 11. A low pressure passage 51 in the manifold cap 48 communicates through the tubular member 43 with a low pressure passage 52 in the casing 11. Cap screws 53 secure the manifold cap 48 upon the head 44 of the tubular member 43.

Figure 6:
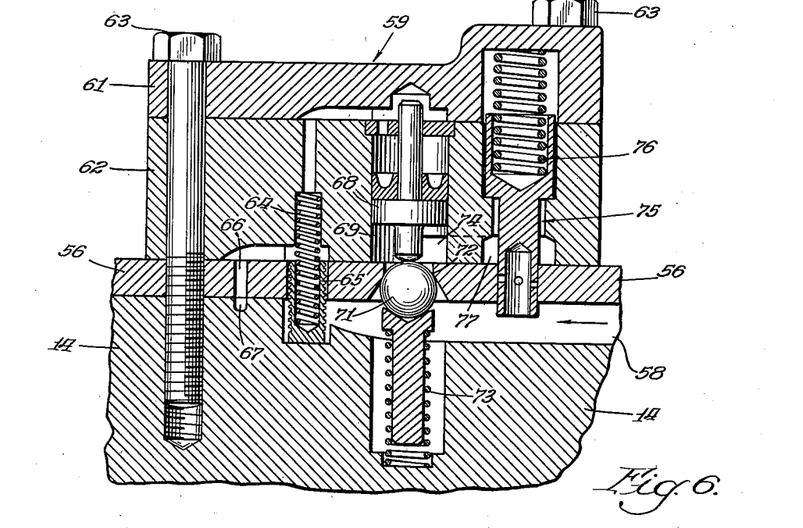
Fig. 6 is a vertical sectional view taken through a pressure controlling device of the apparatus, as indicated by the line 6—6 in Fig. 5.

Passage 52 extends from a lower end 52ª, Fig. 1, near the bottom of the reservoir casing 11 upwardly along the front wall of such casing and thence diagonally upwardly into communication with the tubular member 43, Figs. 1 and 7. Fluid is thus drawn upwardly from the bottom of the reservoir casing into the tubular member 43, thence into the manifold passage 51 and outwardly through an exhaust conduit 54 to the inlet side of the pump (not shown). Fluid is delivered from the pump through a conduit 55 into the manifold passage 47 and thence through the hollow bolt 45, and passage 49, which also leads down the front wall of the reservoir casing 11 as shown in Figs. 1 and 5. The bottom wall 56 of the casing 11 contains a hole 57 through which the lower end of the passage 49 communicates with a channel 58, Figs. 1 and 5, formed in the upper face of the plate 14 and closed by the plate 56. Channel 58 is also shown in Fig. 6 where it leads to a pressure controlling unit 59.

This pressure controlling unit 59, as shown in Fig. 5, lays between the control valve units 15 and 15ª for causing fluid to be delivered under pressure to either or both. Unit 15 is associated with the control mechanism and ram shown in Fig. 1, whereas the unit 15ª is for similar association with another identical control mechanism and ram. With continued reference to Figs. 5 and 6, the pressure controlling unit will be seen to comprise an upper plate 61, an intermediate plate 62, and bores and passages within the plates 56 and 14. Said plates are held in assembly by cap screws 63. While each of the valves 15 and 15ª is in neutral, fluid delivered to the device 59 through the passage 58 and entering a passage 64 past a loosely fitting plunger 65 is trapped to preclude escapement thereof through a hole 66 and a transverse passage 67, Figs. 5 and 6, which leads to each of the control valves. The trapped fluid in the passage 64 exerts its pressure upon the upper side of a piston 68 reciprocable in a bore 69. The pressure of this fluid will be equal to the pressure of the fluid in the passage 58 and since the area of the piston 68 exceeds the area of that portion of a by-pass valve ball 71 covering a seat 72 therefor, the force upon the piston will prevail and said ball will be held unseated against the force of a spring 73. Fluid will therefore escape at low pressure past the unseated ball 71 and through an exhaust passage 74 into the reservoir casing 11. A safety valve 75 is normally closed but is openable against the force of a spring 76 to permit the escape of fluid into the reservoir casing 11 through an exhaust passage 77 only during an abnormal pressure in the passage 58. A transverse pressure delivery passage 78, Fig. 5, intersects the passage 58 for directing liquid therefrom to each of the valves 15 and 15ª.

Referring now to the valve 15, it has a casing 79 containing a cylindrical bore 81 into which there is pressed a sleeve 82 having five axially spaced circumferential grooves, each containing a rubber sealing annulus 83. These sealing rings 83 establish sealed connections between the sleeve 82 and the valve casing 79 while permitting slight transverse movement of the sleeve within its casing as an expedient for increasing manufacturing tolerances and avoiding distortion of the inner periphery of the sleeve when the casing 79 is bolted in place. There are four annular grooves 84, 85, 86, and 87 circumscribing the sleeve 82. These grooves communicate with the interior of the sleeve 82 by means of circumferentially spaced ports 88, 89, 91, and 92. The ends of the bore in the valve sleeve 82 communicate with the reservoir casing 11. There are lands 93, 94, and 95 on the valve spool 33 which control the opened or closed or intercommunicative condition of the various ports 88, 89, 91, and 92.

Annular groove 84 of the valve sleeve 82 communicates with one end of the lateral passage 67 through a vertical passage 96. Annular passage 85 communicates with an L-shaped passage 97 through a passage 98. Annular passage 86 communicates with the transverse fluid delivery passage 78 through a vertical passage 99. Annular passage 87 communicates with an L-shaped passage 101 through a vertical passage 102. Corresponding elements are provided with respect to the valve unit 15ª, and those shown in Fig. 5 are designated by the same respective reference characters as those described above for the valve 15, with the addition of the small letter *a*.

Figure 3:
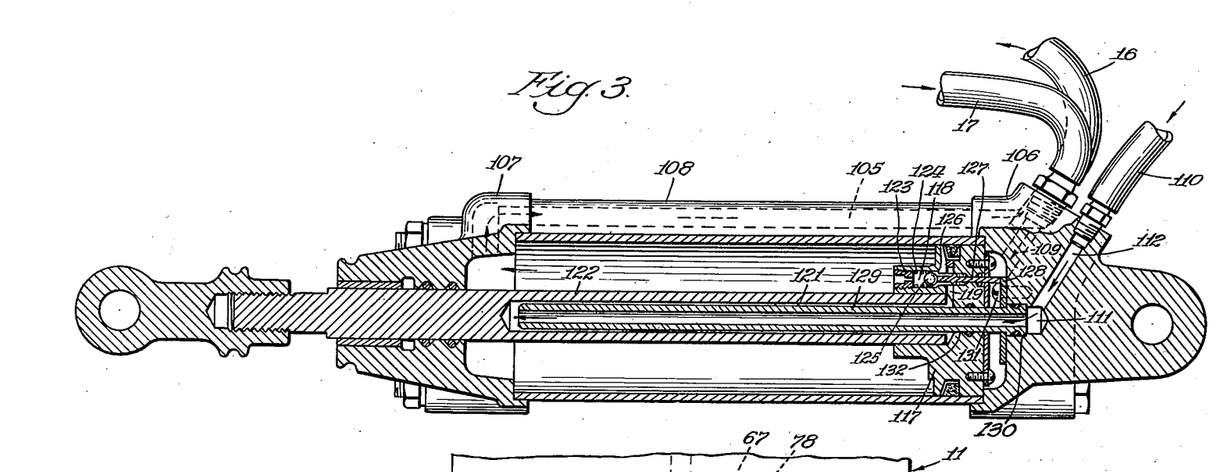
Fig. 3 is a sectional view taken upon a plane extending axially and centrally through the hydraulic ram of Fig. 1.
Figure 4:
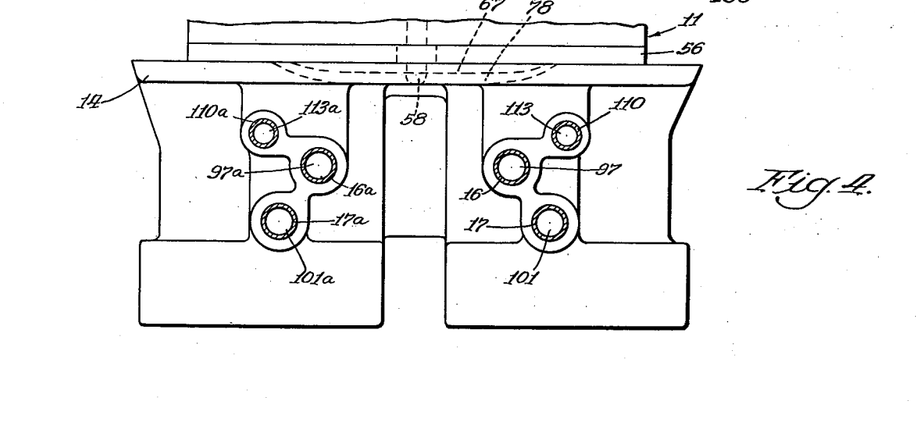
Fig. 4 is a fragmentary sectional view taken on the line 4—4 of Fig. 1.

The horizontal part of the L-shaped passage 97 communicates with the hose 16. The other end of this hose 16, as illustrated in Figs. 1 and 3, communicates with one end of a passage 105 which leads from the cylinder head 106 through a tube 108 to the opposite cylinder head 107 and thence into the piston rod end of the cylinder. L-shaped channel 101, Fig. 1, communicates with one end of the hose 17, of which the other end communicates through a channel 109 of the cylinder head 106 with the end of the cylinder carrying the head 106.

A third hose, 110, extends between the ram 12 and the reservoir casing 11. This hose is a control hose and communicates with a recess 111 in the ram cylinder head 106 through a bore 112. The opposite end of the control hose 110 communicates with an L-shaped bore 113 in the casing plate 14 and thence with a channel 114 in the open face of said plate. A flexible hose 115, which may be considered a section of the control hose 110, is communicatively connected between the channel 114 and an axial bore 116 in the piston rod 24 of the hydraulic device 21 and hence with the cylinder 22.

The ram piston 117 contains a valve receiving bore 118 having a lateral portion 119 which communicates with a pump chamber 121 formed by a bore in the piston rod 122. An apertured plug 123 in an end of the bore 118 serves as a reaction member for a compression spring 124 which urges the ball 125 of a by-pass valve upon a seat 126 for closing this valve. Normally the by-pass 125—126 is closed, but when the piston moves to its limit of movement toward the cylinder head 106, a valve operating stem 127 abuts against a plate 128 and is moved endwise relatively to the cylinder for unseating the ball 125 and thereby opening such by-pass valve. Communication is thereby established between the piston rod end of the cylinder and the bore 121, but not between the two ends of the cylinder. A plunger for the bore comprises a tube 129 having a headed end 130 secured in the cylinder head recess 111 by the plate 128 and screws 131. The tubular rod 122 and the tube 129 constitute a pulsator chamber 121—129. A hole 132 in the piston 117 has a sealing sliding fit with the exterior of the tube 129 whereas there is clearance between the tube and the pump chamber 121 in the piston rod.

Figure 2:
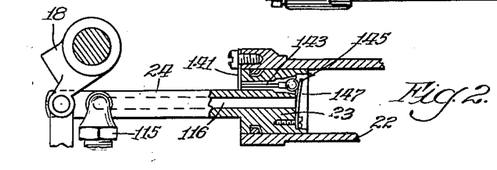
Fig. 2 is a fragmentary view illustrating a hydraulic device of the control mechanism at a limit of operation for opening a by-pass valve of such device.

When the ram piston 117 is at rest, the pulsator chamber 122—129 will likewise be at rest so that fluid within a pulsator chamber formed by the cylinder 22 and piston 23, Fig. 1, will be of fixed volume and held under compression by a contraction spring 136. This spring 136 is connected with intermediate portions of members 137 and 138 which are pivotally connected together by a pin 139 at one end and which have their opposite ends pivotally connected respectively with the piston rod 24 and the cylinder 22 at 25 and 26. This compressive action of the spring 136 upon the fluid in the hydraulic device 21 rigidifies the valve manipulating means so that the manually settable control member 18 can be rocked in either direction for transmitting operating force in corresponding directions to the valve spool 33. When the fluid containing chamber of the hydraulic device 21 is fully extended as illustrated in Fig. 2, an abutment plate 141 mounted on the piston rod end of the cylinder 22 abuts against a valve stem 143 for unseating a ball 144 of a by-pass valve 145 so fluid can escape from the chamber in cylinder 22 through a passage 146. A leaf spring 147 normally holds the valve ball 144 seated. The linkage chamber 22—23 and the ram operated chamber 122—129 together with the conduit structure including the hose sections 110—115 providing communication between such chambers constitute a pulsator

Operation of the apparatus

First, it will be assumed that the entire hydraulic system of the apparatus is completely filled with fluid and that the manual control member 18 has just been moved to the full line position shown in Fig. 1 for causing movement of the ram piston 117 from its rightmost limit of movement illustrated in Fig. 3 toward the piston rod end of the ram cylinder. In moving the control member 18 into the full line position of Fig. 1, the hydraulic linkage 19 which is then rigidified by the action of the spring 136 retaining the fluid in the chamber thereof under compression, will be effective for pivoting the lever 27 clockwise about its fixed pivot 28. Prior to this pivotal movement of the lever 27, the two pins 34 and 35 had occupied similar positions along the profiles 36 and 37 of the cam head 38 and thus caused the valve spool 33 to be in the neutral position N. As the control member 18 was swung counterclockwise and thereby caused clockwise movement of the lever 27, the cam profile 36 pressed against the pin 34 for swinging the lever 31 counterclockwise in moving the valve spool 33 into the operative position R. Continued movement of the control member 18 to the full line position was possible after the valve had been moved to the position R because of the pin 34 traveling beyond the end of the profile 36 into registry with the profile 39 along which it was slidable to permit an overtravel of the cam head 38.

There is a constant flow of fluid from the pump (not shown) into the device through the conduit 55, Fig. 7, and thence through the hollow bolt 45—Figs. 1 and 7, passage 49, hole 57—Figs. 1 and 5, and passage 58—Figs. 1, 5, and 6, to the pressure controlling valve 59. While the valve spool 33 was in the neutral position N, a land 93 thereof was in registry with the valve ports 88 and thereby prevented escape of fluid through the passage 67, Figs. 1, 5, and 6, from the passage 64 in the pressure control valve 59. Consequently, fluid from the passage 58 flowing past the circumferentially ribbed member 65 into the passage 64 built up pressure above the piston 68 for holding the by-pass valve ball 71 unseated so that the fluid entering the passage 58 from the pump could escape at low pressure through the by-pass passage 74 in Figs. 5 and 6.

Upon the movement of the valve spool 33 to the position R, however, the spool land 93 was displaced from the ports 88 so that fluid could escape through these ports into the casing reservoir 11 from the passage 64—Fig. 6, at a greater rate than the fluid could be replaced in said passage 64 through the interstice about the circularly ribbed member 65. The pressure is thereby diminished above the valve piston 68—Fig. 6, so that the spring 73 and the pressure fluid in the passage 58 is effective for closing the valve 71—72 so that pressure builds up in the passage 58 and the transverse passage 78, Figs. 1 and 5.

In Fig. 1, it can be seen that the fluid of increased pressure within the passage 78 then flows upwardly through passage 99 and through the valve ports 91, outwardly through the valve ports 92 into the passage 102, thence through L-shaped passage 101, conduit 17, and passage 109 in the ram cylinder head 106, Fig. 3, into the right end of the ram cylinder for forcing the piston toward the piston rod end of the cylinder. As the piston 117 is moved toward the piston rod end of the ram cylinder, fluid is expelled from the cylinder through the passage 105, conduit 16, L-shaped passage 97, Fig. 1, valve ports 89, and an L-shaped passage 151 in the left end of the spool 33 to the casing reservoir 11.

As the ram piston moves to the left, the pulsator chamber 122—129 increases in volume and thereby adapts such chamber to receive fluid expelled from the chamber of the hydraulic linkage by the force of the spring 136. The rate at which the fluid is transferred from the hydraulic linkage chamber into the ram operated chamber 122—129 is in accordance with the rate of expansion of the chamber 122—129. Fluid reaches the expanding chamber 122—129 through piston rod bore 116, Fig. 1, control hose section 115, channels 114 and 113 in the casing plate 14, control hose section 110, cylinder head passage 112, Fig. 3, and the bore in the hollow rod 129.

The transfer of fluid from the hydraulic linkage chamber to the ram operated chamber 122—129 is in accordance with the amount of movement of the ram piston 117, and as the linkage chamber contracts under the influence of the spring 136, the lever 27 is pivoted counterclockwise and eventually pivots the lever 31 clockwise for returning the valve spool 33 to neutral when the ram piston 117 has moved an amount corresponding to the amount of the initial setting of the manually settable control member 18.

When the control member 18 is moved oppositely, toward the dotted line position, after the contraction of the chamber of the hydraulic linkage has reestablished the neutral position of the valve spool 33, this clockwise swinging of the control member will be operable through the hydraulic linkage for moving the valve spool from the neutral to the position L. This displacement of the valve spool will place the annular space between the lands 93 and 94 in registery with the valve ports 88 so that fluid can escape from the pressure control device 59 through these ports 88 and the L-shaped spool channel 151 into the casing reservoir 11. As a consequence, the pressure controlling device 59 will cause its by-pass valve 71—72 to close and increase the pressure in the channels 58 and 78, Figs. 1, 5, and 6. At the same time, the ports 91, through which high-pressure fluid is introduced into the valve 15, will be communicable through the space between the spool lands 94 and 95 with the ports 89 so that the high pressure fluid is conducted outwardly through ports 89 into the L-shaped channel 97 and therefore introduced into the piston rod end of the ram cylinder for forcing the piston 117 to the right. Concurrently fluid is exhaused from the right end of the ram cylinder through the hose 17, L-shaped passage 101, Fig. 1, and valve ports 92, into the casing reservoir 11, since the valve spool land 95 will then be to the left of the ports 92, Fig. 1.

As the ram piston 117 is thus moved to the right, Fig. 3, the fluid capacity of the ram operated chamber 122—129 is being decreased so that fluid is expelled from the chamber 122—129 through the control hose 110, the passages 113, and 114 in the casing plate 14, and the control hose section 115 and piston rod bore 116 into the hydraulic linkage chamber for extending the hydraulic linkage. This extension of the hydraulic linkage causes the lever 27 to pivot clockwise whereby the lever 31 is pivoted counterclockwise for returning the valve spool from the position L to the neutral position N. When this occurs, coincidentally with the ram piston 117 moving an amount correlated with the amount of initial clockwise displacement of the control member 18, the delivery of fluid to the ram will cease and the transfer of fluid from the ram operated chamber 122—129 to the extensible and retractible linkage chamber will cease.

Although the description of operation has been confined to the valve 15, the ram 12 associated therewith and the particular controls for said valve and ram, identical operation occurs for the valve 15$^a$, its associated ram and the controls for such valve and ram. The setting of either of the valves from its neutral position will permit the escape of fluid from the pressure controlling device passage 64 for creating the high pressure condition of the fluid for operating the rams, and the fluid is prevented from escaping from the chamber 64 of the pressure controlling device 59 when both of the valves 15 and 15$^a$ are set in neutral, whereby the low pressure by-pass condition of the device 59 will prevail.

When the apparatus has been initially assembled and not yet filled with fluid, the spring 136 will hold the chamber of the hydraulic linkage in its fully contracted position, that is, the piston 23, Fig. 1, will be forced all of the way into the cylinder 22. The control member 18 will be set to its oscillative limit shown by the dotted lines in Fig. 1 and this will cause the lever 27 to be rotated its maximum amount counterclockwise whereby the valve 15 will be set in operating position L. Therefore, when the main pump is started, fluid therefrom entering the passage 58, Figs. 1, 5, and 6, will be effective for closing the by-pass valve 71—72. Since the control ports 88 of the control valve 15 will then be in registery with the space between the lands 93 and 94 and communicative with the reservoir through the L-shaped passage 51, pressure cannot build up in the pressure control device passage 64, Fig. 6, and the by-pass valve 71—72 will be closed. Fluid under pressure will therefore flow from the passage 58 and through the lateral 78, valve ports 91 and 89, then between the spool lands 94 and 95, passage 97, conduit 16, and ram passage 105 to the piston rod end of the ram cylinder. At this time there will be some air within the various passages and within the ram cylinder and this introduction of fluid into the cylinder through the passage 105 will cause the air and fluid to be compressed therein sufficiently for moving the ram piston to the right. Concurrently air from the right end of the cylinder will be expelled through the conduit 17, passage 101—Fig. 1, and the valve ports 92 into the casing reservoir 11, the valve spool land 33 at that time being to the left of the ports 92. Also, as the piston 117 moves to the right, the pulsator chamber 122—129 will be operated to expel air through conduit 110, channels 113 and 114, Fig. 1, control hose section 115, the bore in the piston rod 24, and into the cylinder 22 for expanding the hydraulic linkage.

Ultimately, the ram piston 117 will reach its rightmost limit of movement illustrated in Fig. 3, causing the valve stem 127 to open the by-pass valve 125—126 whereby fluid and air within the piston rod end of the cylinder is allowed to discharge through the passage 118—119 into the pulsator chamber 122—129 and thence through the pump into the control hose section 110 and finally into the fluid chamber of the hydraulic valve operating linkage. The hydraulic device 21 has a limited stroke, however, so that full extension thereof while the control member 18 is set in the dotted line position of Fig. 1, which corresponds to the position shown in Fig. 2, the full expansion of the linkage will be insufficient to return the valve from the operating position L to the neutral position N. So long, therefore, as the control member is allowed to be set in the Fig. 2 position, fluid introduced into the piston rod end of the ram cylinder will flow through the by-pass valve 125—126, through the pump 122—129, the control hose sections 110 and 115, and into the fluid chamber of the hydraulic linkage. When the fluid chamber of the hydraulic linkage is fully extended as illustrated in Fig. 2, the valve stem 143 engages the abutment plate 141 and opens the by-pass valve 145 against the force of the spring 147 so that the air and fluid can escape into the reservoir. The apparatus is allowed to operate under this condition sufficiently long for the fluid to wash virtually all of the air from the fluid containing passages. This is a convenient expedient for completely filling the fluid containing passages of the system with the non-compressible liquid. It will be seen that fluid from the normal power hydraulic circuit of the system is admitted to the normal control hydraulic circuit through the valve 125—126 in the ram piston and that the by-pass valve 145 in Fig. 1 is adapted to permit the escape of the fluid from the control circuit.

When the system has been filled with oil which has displaced the air, the manually settable control member 18 can be swung counterclockwise from the limit of its clockwise movement sufficiently to operate the hydraulic control linkage for setting the valve spool 33 in the neutral position. The control member 18 and the ram piston 117 will then be predeterminedly phased. Additional movement of the control member 18 in the counterclockwise direction will cause the valve spool 33 to be set into the operating position R so that fluid from the main pump will be introduced into the right end of the ram cylinder as explained hereinabove for causing movement of the ram piston toward the piston rod end of such cylinder. A few strokes of the control member 18 swinging the same first clockwise and then counterclockwise and thereby causing pumping action of the ram will quickly cause all of the air in the right hand end of the ram cylinder to be displaced into the reservoir 11, where it escapes from above the fluid level.

Normally, the control member 18 will be manipulated within a range of movement between the full line position shown in Fig. 1 and a position just short of the dotted line position of Fig. 1. Within this normal range of movement of the control member 18, the ensuing movement of the ram plunger will be in a direction and amount correlated with the direction and amount of movement of the control member. During this normal operation of the apparatus, neither of the by-pass valves 125—126 in the ram piston nor 145 in the hydraulic linkage piston will be opened. If, however, leakage of fluid should occur from the hydraulic control system including the ram operated pulsator chamber 122—129 and the pulsator chamber 22—23, incorporated into the hydraulic control linkage 19, Fig. 1, so that the ram piston operates somewhat out of phase with respect to the phase relation initially established by moving the control member 18 into the dotted line position in Fig. 1, the initial predetermined phase relation can be immediately reestablished simply by placing the control member into the dotted line position so that the ram piston 117 will be forced into the Fig. 3 position. Fluid will then be forced from the piston rod end of the cylinder past the open by-pass valve 125—126 into the pulsator chamber 122—129 and thereby force sufficient fluid into the hydraulic linkage pulsator chamber 22—23 for replenishing the fluid lost by leakage and fully expanding the hydraulic linkage.

It is also contemplated that out of phase relation of the manually settable member 18 and the ram piston 117 may occur by leakage of fluid past the ram piston 117 from the right end of the cylinder to the left end thereof. Should this occur, it would create the out of phase relation which would cause the piston 117 to lag behind the position it should be relatively to the control lever 18 when this lever is moved toward the dotted line position in Fig. 1 for causing the piston to move toward the right end of the ram cylinder. When this condition prevails, it can be likewise corrected by simply setting the control member 18 into the dotted line position. Thereafter when the ram piston operates the control system pulsator chamber 122—129 for fully extending the hydraulically controlled linkage before the ram piston reaches the right end of its cylinder, the fully extended hydraulic linkage will be incapable of returning the control valve spool 33 to the neutral position from the L operating position, wherefore fluid will continue to be delivered into the piston rod end of the ram cylinder and eventually cause the piston to reach the right end of the cylinder in the predetermined phase relation with respect to the control member 18. As long as the control member 18 remains in the extreme dotted line position fluid delivered by the main pump will flow successively through the ram piston by-pass valve 125—126 and the hydraulic linkage by-pass valve 145 as explained hereinabove in the explanation of rephasing when the control member 18 and the ram piston were out of phase in the opposite direction. The flow of fluid through the hydraulic linkage chamber is stopped when the control member is moved far enough from the extreme dotted line position to operate the hydraulic linkage for returning the valve spool 33 to neutral. The rephased condition of the manually settable control member 18 and the ram piston will prevail until there has been a cumulative leakage past the ram piston or from the control hydraulic circuit including the pulsator chamber 122—129 and 22—23. As explained above, however, it is a simple matter to correct an out of phase relation in either direction, and such correction is likely to be made periodically by an operator inadvertently placing the manual control lever in the extreme dotted line position without there being immediate need of doing so.

Having thus described a single preferred em- bodiment of the invention with the view of clearly and concisely illustrating the same, we claim:

1. In a control for a two-way hydraulic ram having a cylinder and a piston, a source of pressure fluid for the operation of said ram, a control valve from which said ram is remotely disposed, said valve having communicative connections with the source and with the ram and being settable in opposite directions from a neutral to establish said communicative connections for operation of the ram in respectively opposite directions, a hydraulic assemblage connected with the valve and manually operable in opposite directions for selective setting of the same, the assemblage being hydraulically operable in either of opposite directions for returning the valve toward neutral according to whether fluid is received by or expelled from such assemblage, a hydraulic pulsator including intercommunicative expansible and contractible chambers of which one is incorporated into said assemblage as a hydraulic receiver and operator thereof, the other of such chambers being associated with said ram in a manner to be expanded or contracted thereby, said ram-associated chamber being contracted by the ram to pump fluid from such chamber into the assemblage-incorporated chamber as the ram piston approaches a limit toward one end of the cylinder and to accommodate fluid expelled from the assemblage pursuant to reverse movement of the piston, said valve being returned toward neutral by operation of the assemblage while receiving fluid and stopping short of reaching neutral should there be a deficiency of fluid in the pulsator wherefore the piston continues to said limit, and means including a by-pass valve operable substantially coincident with the piston reaching said limit to establish communication between the source and said pulsator to increase the quantity of fluid therein by the amount of such deficiency.

2. The combination set forth in claim 1, wherein there is a conduit providing the communication between the pulsator chambers, and wherein said by-pass valve is associated with the ram and is disposed to provide the communication between the source and assemblage-incorporated chamber by way of said conduit.

3. The combination set forth in claim 1, wherein there is another by-pass valve associated with said pulsator to open and facilitate discharge of the fluid from said source therefrom when the assemblage-incorporated chamber is fully expanded.

4. In a control for a hydraulic ram having a cylinder and a piston; a source of pressure fluid for said ram; a control valve; conduit means connecting the valve and source and connecting respective ends of the cylinder with said valve; said valve being settable from a neutral position wherein communication between the source and the ram through the conduit means is precluded to a position wherein communication is established through the conduit means from the source to one end of the ram cylinder and communication is also established between the other end of the cylinder and a place of exhaust; a hydraulic pulsator comprising intercommunicative expansible and contractible chambers of which one is operated by the ram to expel fluid as the ram piston is moved toward said other end of the cylinder; valve operating means including a member manually settable within a range, an extendible and contractible hydraulic linkage operably connected between said member and the valve, said hydraulic linkage incorporating the other expansible and contractible chamber which when varied in expansion causes variation in the degree of extension of said linkage, spring means for retaining the fluid in said linkage chamber under compression while biasing the linkage toward a variation in length oppositely to the variation caused by fluid entering the linkage chamber from the other chamber of the pulsator, and a by-pass valve opened to facilitate discharge of fluid from said linkage chamber substantially coincident with said chamber being fully expanded; a second by-pass valve openable to establish communication between the one end of the ram cylinder and said other chamber substantially coincident with the piston reaching a limit toward said other end of the cylinder; said linkage being capable of transmitting setting force from the manually settable member to the control valve to place it in said operating position when said member is moved toward a limit of its setting range, said linkage being operable by the ensuing delivery of fluid from the said other chamber into said linkage chamber for returning the valve toward neutral, and the linkage being so limited in operation that when the control member is set at said limit of its setting range full expansion of the chamber causes insufficient linkage operation to completely return the valve to neutral, whereby if the control member and piston are so dephased that the linkage chamber becomes fully expanded before the piston reaches its limit the failure of the fully expanded chamber to have returned the control valve to neutral will cause continued fluid delivery from the source into the one end of the cylinder to complete movement of the piston to its limit, and whereby if the control member and piston are so dephased that the piston reaches its limit prior to full expansion of the linkage chamber the second by-pass valve will be opened to admit fluid from the source to supply the linkage chamber deficiency incident to fully expanding the same.

5. In a control for a hydraulic motor; a source of pressure fluid for said motor: a valve manipulatable from a neutral position wherein it is effective to communicatively isolate the motor from said source to an operating position establishing communication between the source and motor to cause motor operation; a hydraulic pulsator comprising inter-communicative expansible and contractible chambers of which one is operated by said motor in a manner causing fluid displacement in an amount correlated with the degree of operation of the motor; and valve manipulating means including a manually settable member, an extendible and contractible hydraulic linkage operably connected between said member and the valve, said hydraulic linkage including the other pulsator chamber which when varied in volume causes corresponding variation in the degree of extension of said linkage, and means for compressing fluid in said linkage chamber while biasing the linkage toward a variation in length oppositely to that variation caused by fluid pumped into said chamber from the ram-operated chamber, said linkage being capable of transmitting manipulating force from the manually settable position to the valve to place it in the operating position, and the linkage being operable by the ensuing exchange of fluid between the chambers to return the valve to neutral pursuant to operation of the motor an amount correlated with the distance the settable member is set.

6. In a control for a two-way hydraulic ram; a source of pressure fluid for said ram; a valve with respect to which said ram is remotely disposed; conduit means communicative between said valve and said source; flexible hose means communicative between said valve and said ram; said valve being manipulatable from a neutral position wherein it is effective to communicatively isolate the motor from said source to alternative operating positions disposed oppositely from the neutral to establish communication through said conduit means and said hose means between said source and respective opposite ends of the ram for causing it to be operated in selectively opposite directions; a hydraulic pulsator comprising inter-communicative expansible and contractible chambers of which one is operated by said ram in a manner causing fluid displacement in direction and amount correlated with the direction and amount of operation of the ram; and valve manipulating means including a manually settable member, and an extendible and contractible hydraulic linkage operably connected between said member and the valve, said hydraulic linkage including the other pulsator chamber which when varied in volume causes corresponding variation in the degree of extension of said linkage; a control hose communicating between said chambers to provide for their inter-communication, and means for compressing fluid in said linkage chamber while biasing the linkage toward a variation in length opposite to that variation caused by fluid pumped through the control hose into such linkage chamber, said linkage being capable of transmitting manipulating force from the manually settable member to the valve for setting the latter in either of said opposite positions from neutral, and said linkage being operable by ensuing transfer of fluid between the chambers to return the valve to neutral pursuant to operation of the ram in direction and amount correlated with the direction and distance of setting of the settable member.

7. In a control for a hydraulic ram having a cylinder and a piston; a source of pressure fluid for said ram; a valve; conduit means connecting the valve and source and connecting respective ends of the ram cylinder with the valve; said valve being manipulatable from a neutral position wherein communication between the source and the ram through said conduit means is precluded to a position whereby communication is established through the conduit means from the source to one end of the ram cylinder and communication established between the other end of the ram cylinder and a place of exhaust; a hydraulic pulsator comprising inter-communicative expansible and contractible chambers of which one is operated by the ram to expel fluid as the ram piston is moved toward said other end of the cylinder; and valve operating means including a manually settable member, an extendible and contractible hydraulic linkage operably connected between said member and the valve, said hydraulic linkage including the other of said pulsator chambers which when varied in volume causes corresponding variation in the degree of extension of said linkage, means for compressing fluid in said chamber while biasing the linkage toward a variation in length oppositely to that variation caused by fluid entering the linkage chamber from the ram-operated chamber, and a by-pass valve opened to facilitate discharge of fluid from said linkage chamber substantially coincidentally with said chamber being fully expanded; a second by-pass valve openable to establish communication between the one end of the ram and said pulsator substantially coincident with the ram piston reaching a limit toward said other end of the cylinder; said linkage being capable of transmitting manipulating force from the manually settable member to the valve to place it in said operating position when the settable member is moved toward a limit of its setting range, said linkage being operable by the ensuing delivery of fluid from the ram-operated chamber into said linkage chamber and while reacting against the set settable member for returning the valve toward the neutral position but said linkage chamber becoming fully expanded to terminate such operation of the linkage and avoid return of the valve to neutral when said manually settable member has been set to a terminus of its setting range, whereby, after the ram piston reaches said limit toward the other end of the cylinder into a predetermined phased relation with the control member, fluid from the source can escape past the second by-pass valve into said linkage chamber, and outwardly of the linkage chamber through the first by-pass valve.

8. In a control for a two-way hydraulic ram having a cylinder and a piston; a source of pressure fluid for said ram; a valve communicatively connected with said source and with opposite ends of the ram cylinder; said valve being settable in opposite directions from a neutral setting wherein it is ineffective for establishing communicaton between the source and ether end of the cylinder, said valve being operable when in one of said positions to establish communication between the source and one end of the cylinder while establishing communication between the other end of the cylinder and a place of exhaust and being operable when in the other position from neutral for establishing communication between the source and said other end of the cylinder while establishing communication between the one end of the cylinder and said place of exhaust; a hydraulic pulsator comprising inter-communicative expansible and contractible chambers of which one is operated by said ram for discharging fluid when the ram piston is moved toward said other end of the cylinder; and valve setting means comprising a settable member variously settable within a range of movement thereof, a hydraulic linkage connected between said member and the valve and operable to transmit force from said member for setting the valve in the one position when the member is set toward one limit of its range and for setting the valve in the other position when the member is moved toward the other limit of its range, said hydraulic linkage including the other pulsator chamber which is an expansible chamber for causing said linkage to move the valve from said one position toward the neutral but having insufficient expansion for completely resetting the valve to neutral when the control member has been set to the limit of its range, and a by-pass valve associated with said linkage chamber and operable to discharge fluid therefrom coincident with it becoming substantially fully expanded; a conduit communicative between said chambers to provide the inter-communication therebetween and thus deliver into the linkage chamber the fluid discharged from the ram-operated chamber thereinto while the piston moves toward said other end of the ram cylinder; and a second by-pass valve conditioned for by-passing fluid from the one end of the cylinder into said linkage chamber by way of said conduit coincidentally with the piston reaching the other end of the cylinder.

9. The combination set forth in claim 8, wherein the ram-operated chamber contains a port through which fluid is admitted from the conduit when the ram piston is moved toward the one end of the cylinder and through which port fluid is discharged into the conduit when the ram piston is moved toward the other end of the cylinder, and wherein the chamber is arranged in series with the second by-pass valve and said conduit.

10. The combination set forth in claim 8, wherein the ram-operated chamber comprises an open-ended axial bore communicating through the ram piston and a hollow rod anchored in said other end of the ram cylinder and projecting into said pump chamber, said conduit being communicative with said chamber through said hollow rod, and said second by-pass valve being within the ram piston for providing communication between the one end of the ram cylinder and said chamber when such valve is open.

11. The combination set forth in claim 8, wherein a piston rod is connected with the ram piston and projects therefrom through a gland in the one end of the ram cylinder, wherein said ram-operated chamber comprises an axial bore extending from within said piston rod through said piston and a hollow rod anchored in said other end of the ram cylinder and projecting into said chamber, the exterior periphery of said hollow rod being in sealed sliding relation with a portion of the bore in said piston and being in radially spaced relation with respect to that portion of the bore within the piston rod, a bore in said piston communicating between the one end of the ram cylinder and the piston rod bore, and said second by-pass valve being disposed within the last-named bore.

12. In a two-way hydraulic ram and a control for the admittance of operating pressure fluid therein, a ram cylinder, a piston reciprocable in said cylinder, a piston rod extending through one end of the cylinder, means for the selective admittance of fluid into opposite ends of said cylinder, a pulsator comprising a chamber in the form of an axial bore extending through said piston from the end thereof disposed toward the other end of said cylinder and into the piston rod, a portion of said bore within the piston being of smaller diameter than the portion within the piston rod, a hollow rod anchored in said other end of the cylinder and projecting into the pump chamber through said smaller diameter portion of the bore in the piston, a control channel in said other end of the cylinder communicative with the interior of said hollow rod, a valve-receiving bore in said piston and communicative between the one end of the cylinder and said pulsator chamber, a normally closed by-pass valve within said valve-receiving bore, and means for opening said by-pass valve coincident with the approach of said piston toward said other end of the cylinder.

13. The combination set forth in claim 8, wherein the extendible and contractible linkage chamber is in the form of a cylinder having a piston therein, and wherein said linkage in addition to including said cylinder and piston includes a pair of members pivotally connected together at one end and having their opposite ends respectively pivotally connected with said piston and said cylinder, and a spring connected between said members and imparting force thereto tending to move the piston in the direction to diminish the content of the cylinder bore.

JOHN R. ORELIND.
CARL W. MOTT.

REFERENCES CITED

The following references are of record in the file of this patent:

UNITED STATES PATENTS

| Number | Name | Date |
|---|---|---|
| 897,907 | Lang | Sept. 8, 1908 |
| 2,010,645 | Roberts | Aug. 6, 1935 |
| 2,192,963 | Davis | Mar. 12, 1940 |
| 2,292,916 | Wheelon | Aug. 11, 1942 |
| 2,385,942 | Rockwell | Oct. 2, 1945 |

FOREIGN PATENTS

| Number | Country | Date |
|---|---|---|
| 702,983 | Germany | Feb. 25, 1941 |
| 558,460 | Great Britain | Jan. 6, 1944 |